Sept. 9, 1924.
H. O'B. HARDING
BROILER
Filed Sept. 17, 1923  2 Sheets-Sheet 1
1,507,733
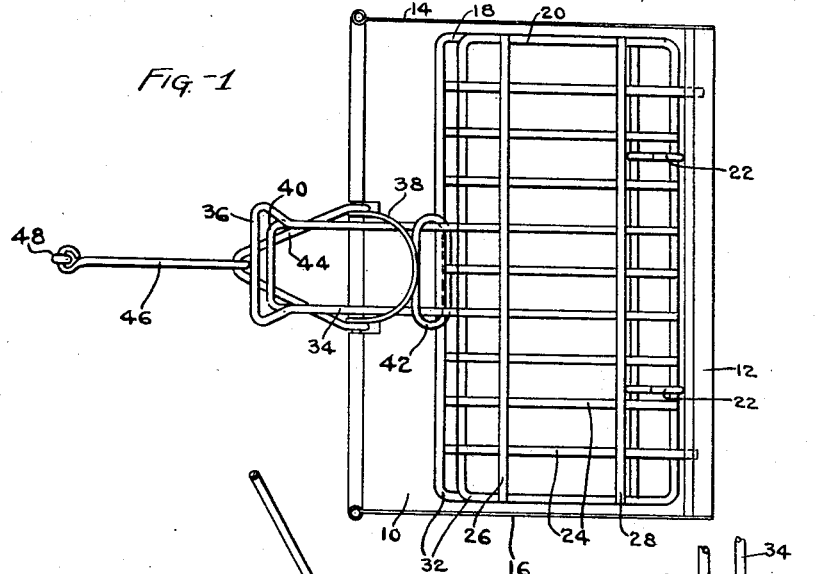
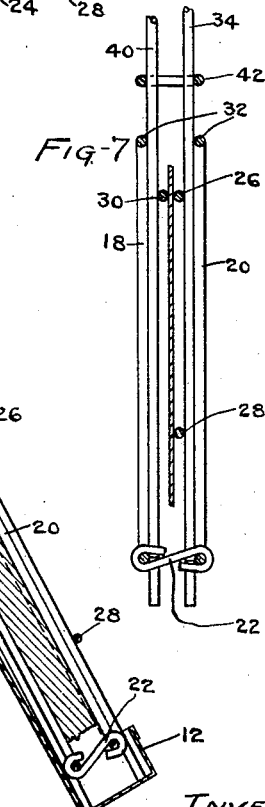
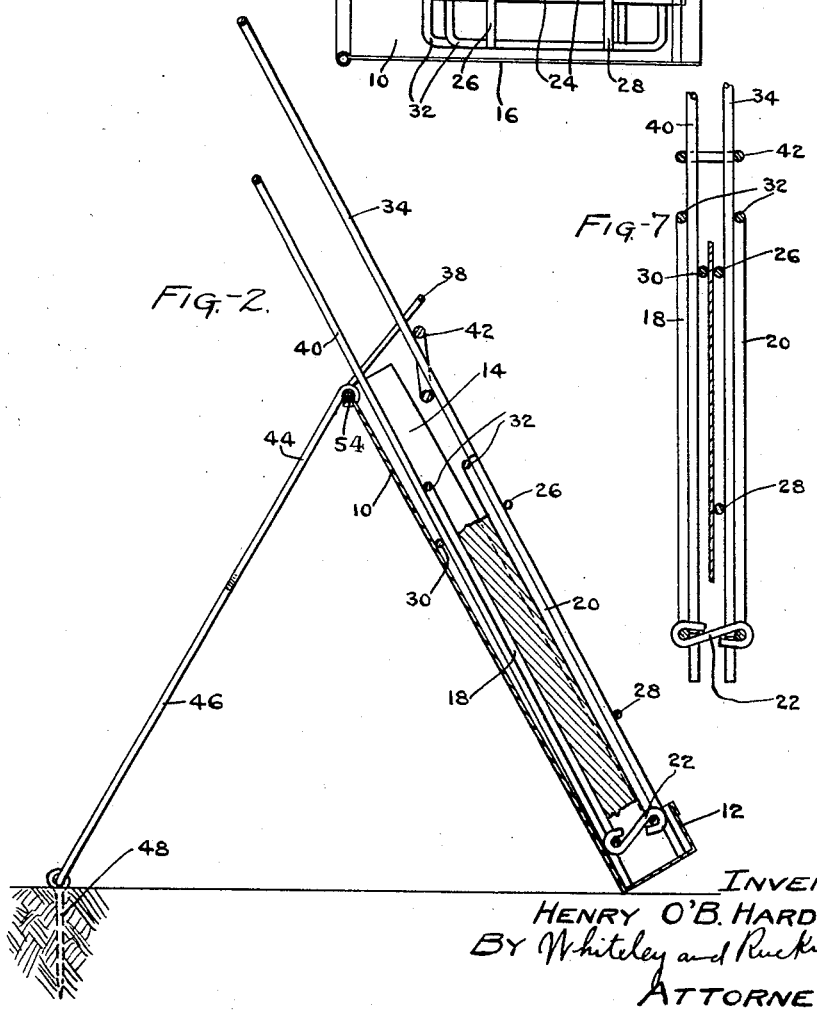
INVENTOR.
HENRY O'B. HARDING.
BY Whiteley and Ruckman
ATTORNEYS.

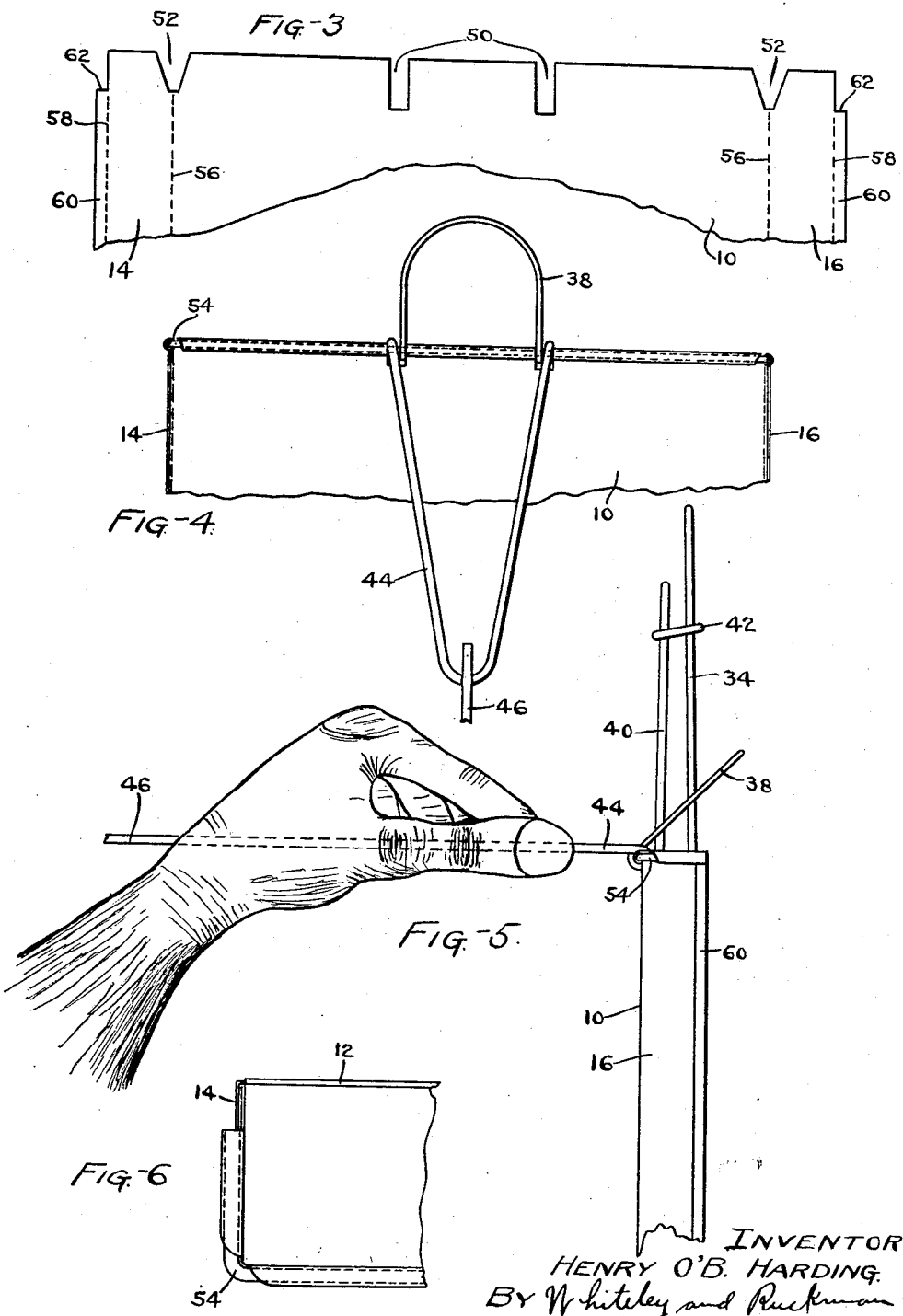

Patented Sept. 9, 1924.

1,507,733

UNITED STATES PATENT OFFICE.

HENRY O'B. HARDING, OF MINNEAPOLIS, MINNESOTA.

BROILER.

Application filed September 17, 1923. Serial No. 663,079.

*To all whom it may concern:*

Be it known that I, HENRY O'B. HARDING, a citizen of the United States, residing at Minneapolis, in the county of Hennepin and State of Minnesota, have invented certain new and useful Improvements in Broilers, of which the following is a specification.

My invention relates to broilers, and an object is to provide a device of this character which can be conveniently carried from place to place and set up for use adjacent a campfire, so as to be available by tourists or by other persons who may desire to broil meat or fish, or toast bread while in the open, or even before an open fire while at home.

The full objects and advantages of my invention will appear in connection with the detailed description, and the novel features of my inventive idea will be particularly pointed out in the claims.

In the accompanying drawings, Fig. 1 is a top plan view of the broiler in folded condition. Fig. 2 is a vertical, sectional view of the broiler set up for use. Fig. 3 is a fragmentary view showing the manner in which the upper edge portion of the pan is cut. Fig. 4 is a fragmentary view showing the upper edge portion of the pan in finished condition. Fig. 5 is a side elevational view showing the manner in which the prop or support for the broiler may be grasped by hand. Fig. 6 is a fragmentary view looking at the upper end of the pan. Fig. 7 is a fragmentary view corresponding generally to Fig. 2, but showing the grill differently adjusted.

In carrying out my invention, I provide a sheet metal pan consisting of a back member 10 at the bottom of which is a trough formed by a short upwardly extending wall 12, the ends of which are bent backwardly toward the back member 10. The back member is open at its top while at the sides it is provided with flanges 14 and 16. Adapted for cooperation with the pan, is a grill consisting of two members 18 and 20 hinged together at their bottom ends by links 22. Both members of the grill include a plurality of longitudinal wires 24, and the grill member 20 has an upper cross wire 26 and a lower cross wire 28, while the grill member 18 has a cross wire 30 located at the same relative position as the cross wire 26. The longitudinal wires of the grill members are secured as by soldering to the surrounding frame wires 32, and as shown in Figs. 1 and 2, the longitudinal wires located nearest the surrounding frame are made somewhat longer at their lower ends than the other longitudinal wires in order that the grill may be held up out of the grease in the trough. Two of the longitudinal wires of the grill 20 located toward the middle thereof are extended upwardly to form a handle 34, the branches of which are bent outwardly near their upper ends to form a connecting member 36 which is of greater length than the distance between the main portions of the branches. The handle 34 extends through a wire turning loop 38 secured to the upper end of the pan, and the connecting member 36 prevents this handle and the attached grill member from becoming detached from the pan except upon turning the handle through a partial rotation. Two of the longitudinal wires of the grill member 18 located toward the middle thereof are extended to form a handle 40 which, when the grill is folded together, is adapted to pass through an elongated wire ring 42 which is slidable on the handle 34 and is prevented from becoming detached therefrom by the flared member 36. In order to hold the broiler in substantially vertical position, a prop is pivotally attached to the upper end of the pan. This prop includes a forked member 44, the free ends of which are attached to the pan, and also includes a single member 46 secured to the connecting portion of the forked member. The lower end of the member 46 is adapted to rest upon the ground, and in order to prevent the broiler from being blown down by the wind or knocked down, a pin 48 is attached to the lower end of the member 46. This pin is capable of being pushed into the ground as shown in Fig. 2, and the prop may be used to support the broiler either in inclined position or in vertical position as desired. In the construction of the device, the upper edge portion of the pan is provided with a pair of notches 50, located near the middle of this edge, and is provided with a pair of notches 52 located near the respective ends of this edge. The upper edge is beaded over a wire 54, and the flanges 14 and 16 are produced by bending the sheet metal at right angles on the dotted lines 56. The notches 52 allow the material to be readily bent in this manner. The edges of the flanges 14 and 16 are preferably re-inforced by bending the material over on the dotted lines 58 to form the reinforcing portions 60, as best shown in Fig. 5. In order that the reinforcing portions 60 may be readily bent over to fit snugly upon the main portion of the flanges, these reinforcing portions are cut off in line with the bottoms of the notches 52, as indicated at 62. The notches 50 provide recesses so that the ends of the fork 44 and the ends of the loop 38 may be pivotally attached to the wire 54. As shown in Fig. 6, the lower ends of the side flanges of the pan are fastened against the bent over end portions of the wall 12 of the trough to form a tight joint so that there be no escape of grease at the ends of the trough.

The operation and advantages of my invention will now be obvious. When the device is to be used for broiling, the grill members are lifted up out of the trough, and then slid so as to extend out beyond the bottom of the pan, thereby releasing the handle 40 so that the grill member 18 may be swung over into open position. It will be understood that in order to conveniently perform this manipulation, the grill members are rotated through 180° from the position shown in Fig. 2. The food which is to be cooked is placed on the grill member 20, and the grill member 18 is swung back so as to be properly spaced with relation to the grill member 20. The grill members are then slid upwardly, the handle being pushed through the wire turning loop 38, and the bottom of the grill members being again disposed in the trough. When thick material such as steak is to be broiled, the grill members are disposed as shown in Fig. 2, with the cross wires 26 and 28 outside the space between the grill members. When thin material such as slices of bacon are to be broiled, the grill members are reversed, so as to bring the cross wires 26 and 30 within the space between the grill members, as shown in Fig. 7. The cross wires will grip the slices at the upper portion of the grill and prevent them from sliding down and becoming bunched. Furthermore the handle member 40 is at this time slid through the ring 42 so that the cross wires 26 and 30 are maintained in clamping engagement with the bacon or other thin material. When the device is in use for broiling, the back member 10 serves to concentrate the heat upon the meat or other material being cooked, and the trough catches the juices of the meat. When the grill members are slid out of the trough, they may be readily turned over so that both sides of the material will be thoroughly cooked. In order to accomplish this result, the forked member 44 may be grasped by one hand, as shown in Fig. 5, and the other hand used to turn over the grill upon sliding it slightly upward so that the lower end is brought out of the trough. The broiler may also be carried by grasping the forked member which being protected from the heat of the fire, does not become very much heated. In the use of my broiler, it is placed at the side of the fire instead of over the latter so that the flavor of the material being cooked is not impaired by smoke from the fire or by smoke caused by fat falling into the fire. On account of the grill being placed within a pan or member having a solid back, chilling of the side of the material away from the fire while the cooking is going on, is prevented.

The forked member 44 has the two fold function of holding the pan supported in different angular positions, and of forming a member which may be grasped by the hand to hold the pan suspended therefrom without lateral oscillation. Therefore it constitutes a combined prop and handle. On account of some of the longitudinal wires 24 being extended equal distances from the bottoms of the grill members, the transverse wires 26 and 30 will always be positioned with one of these wires exactly superposed with relation to the other with these wires in a common plane, so that when the device is in use for broiling thin slices, such as bacon, the upper ends thereof will be firmly clamped between the two wires when the wire ring 42 is slid into the position shown in Fig. 7 to force the two transverse wires toward one another. The provision of the extended longitudinal wires therefore involves a three fold function since they also hold the grill up out of the grease in the trough and cause the grill members to be so positioned that the meat therein is everywhere exposed above the upper edge of the short trough wall to the heat of the fire.

I claim:

1. A broiler comprising a pan having a trough at its lower end, a grill having complemental members hingedly connected at their lower ends, handle members extending from the upper ends of said grill members, means for slidably attaching said handle members to said pan which permits said grill members to be rotated when slid out of said trough, and a prop pivotally attached to the upper edge of said pan, said prop having a forked upper portion adapted to be grasped by the hand to hold said pan.

2. A broiler comprising a pan having a trough at its lower end, a grill having complemental members hingedly connected at their lower ends, handle members extending from the upper ends of said grill members, the upper edge of said pan having a pair of recesses, a wire loop having its ends pivotally received in said recesses, said loop being adapted to slidably receive said handle members, and a prop having a forked upper portion whose ends are pivotally received in said recesses, said forked portion being adapted for grasping by the hand to hold said pan.

3. A broiler comprising a pan and a trough with a flat bottom extending at right angles to the pan, and a meat-holding grill in the pan consisting of two reversible members formed of longitudinal and transverse wires, the transverse wires being secured on the same side of all of the longitudinal wires and on opposite sides of the respective grill members and at the same distance from the bottoms thereof, some of said longitudinal wires being extended equal distances from the bottoms thereof to engage the bottom of the trough and hold the transverse wires in a common plane so that they impinge upon strips of bacon or the like and hold them in broiling position.

4. A broiler comprising a pan having a trough at its lower end extended outwardly from the body of the pan and having a front wall spaced therefrom and substantially parallel therewith, a pair of meat-holding grill members formed of longitudinal and transverse wires, links secured to the bottoms of said grill members to hold them in relatively spaced position within the trough, and extensions at the bottom of each grill member to engage the bottom of the trough, whereby the grill members are adapted to be reversed in position so as to hold relatively thick meat such as steak, fish, etc., with the longitudinal wires in one position, and to hold relatively thin meat such as bacon, ham, etc., with the transverse wires in the other position.

5. A broiler comprising a pan and a meat-holding grill associated with the pan consisting of two wire members with wire loop handles extending beyond the pan, a wire set into the upper edge of said pan and enveloped by the metal thereof, there being a pair of spaced notches in the pan adjacent the center of the upper edge across which the wire extends free, a combined prop and handle having a forked end the individual portions of which are pivotally supported on said free portions of wire, and a loop of wire also pivotally supported on said free portions and adapted to encircle the handles of the grill.

In testimony whereof I hereunto affix my signature.

HENRY O'B. HARDING.